UNITED STATES PATENT OFFICE.

CALEB G. COLLINS, OF NEW YORK, N. Y., ASSIGNOR TO CALVIN AMORY STEVENS, OF SAME PLACE.

PROCESS OF EXTRACTING ZINC AND COPPER FROM THEIR ORES.

SPECIFICATION forming part of Letters Patent No. 659,338, dated October 9, 1900.

Application filed October 30, 1899. Serial No. 735,289. (No specimens.)

*To all whom it may concern:*

Be it known that I, CALEB G. COLLINS, a citizen of the United States, residing at New York, (Woodmere,) in the county of Queens and State of New York, have invented a certain new and useful Improvement in the Art of Extracting Copper and Zinc from their Ores, of which the following is a specification sufficient to enable others skilled in the art to which the invention appertains to make and use the same.

My invention relates to the extraction of copper and zinc from their ores; and it consists, essentially, in subjecting the reduced or crushed ores of these metals to the action of a solution of what is technically known as "niter-cake," a residuum resulting from the manufacture of nitric acid, thus utilizing for this purpose what has been practically a waste by-product or one that is comparatively cheap, plentiful, and easily obtainable.

In using the term "niter-cake" I refer to a residual substance composed, substantially, as follows: sulfate of sodium, 75.80 per cent.; free sulfuric acid, 16.68 per cent.; water, six per cent.; insoluble matter, 1.52 per cent.; total, one hundred per cent.

The strength of the solution may be varied with relation to the character of the ore to be treated. I have found a saturated solution desirable for general use. Should the ore carry iron, alumina, or other soluble substance in large quantities, a weaker solution may be used to avoid waste by reason of the affinity of the solution for such substances, its affinity for copper or zinc being greater, so that in the absence of an excess of the niter-cake in the solution the latter will take up only the copper or zinc. For instance, I have found when using a weak solution of, say, about 5° Baumé scale that the solution exercises a selective action on these metals.

The process consists in immersing the zinc or copper ore, roasted or otherwise, in a powdered state in a bath of water in which more or less of the niter-cake is held in solution and in subjecting the powdered ore to the action of this solution until all the copper or zinc present is dissolved out and extracted from the ore. The bath is then filtered to remove the residual ore and the copper or zinc electrically deposited from the solution or otherwise precipitated, as may be preferred.

I am aware that it has been proposed to reduce gold ore by calcination with sodic sulfate or "salt-cake," as in patent to C. P. Williams, No. 292,605, of January 29, 1884; also, that it has been proposed to use niter-cake and salt-cake for preparing gold ore for amalgamation and desulfurization, as in patents to C. R. Squire, No. 309,168, of December 9, 1884, and Nos. 312,586 and 312,587, of February 17, 1885; but I am not aware that powdered zinc or copper ores, either roasted or raw, have ever been treated to a solution of niter-cake for the purpose of dissolving out the said metals, as above described.

What I claim as my invention, and desire to secure by Letters Patent, is—

1. The herein-described process of treating ores of copper and zinc, and other metals soluble only in a strong solution of the solvent, which consists in immersing the comminuted ore, in a solution containing sodium sulfate and bisulfate (niter-cake), in proportion to the contained copper and zinc therein, but sufficient in strength to dissolve only copper and zinc therefrom, and subsequently recovering these metals from the solution, substantially as described.

2. The herein-described process of treating ores of copper and zinc which consists in immersing the comminuted ore in a solution containing sodium sulfate and bisulfate (niter-cake) removing the depleted ore and extracting the metal therefrom by electrolytic action, adding more comminuted ore to the remaining solution, and repeating the operation, substantially as described.

3. The herein-described process of treating ores of copper and zinc containing other metals soluble in any excess of solution which may be employed above that required to dissolve the copper and zinc contained therein, which consists in introducing comminuted ore into a solution containing sodium sulfate and bisulfate (niter-cake) not exceeding 5° Baumé, and subsequently recovering the copper and zinc from the solution, substantially as set forth.

CALEB G. COLLINS.

Witnesses:
D. W. GARDNER,
GEO. WM. MIATT.